United States Patent
Ekambaram et al.

(10) Patent No.: US 9,317,416 B2
(45) Date of Patent: Apr. 19, 2016

(54) MERGING AUTOMATED TESTING REPORTS

(71) Applicant: International Business Machines Corporation, Armonk, NY (US)

(72) Inventors: Vijay Ekambaram, Chennai (IN); Ashish K. Mathur, Bangalore (IN); Vikrant Nandakumar, Chennai (IN); Vivek Sharma, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/282,382

(22) Filed: May 20, 2014

(65) Prior Publication Data
US 2015/0339218 A1 Nov. 26, 2015

(51) Int. Cl.
G06F 9/44 (2006.01)
G06F 11/36 (2006.01)

(52) U.S. Cl.
CPC ............ *G06F 11/3692* (2013.01); *G06F 11/36* (2013.01)

(58) Field of Classification Search
CPC . G06F 11/36; G06F 11/3604; G06F 11/3612; G06F 11/3616; G06F 11/362; G06F 11/3664; G06F 11/3668; G06F 11/3692
USPC .......................... 717/124, 125, 127, 130, 131
See application file for complete search history.

(56) References Cited

U.S. PATENT DOCUMENTS

| | | | |
|---|---|---|---|
| 6,993,747 B1 | 1/2006 | Friedman | |
| 7,559,053 B2* | 7/2009 | Krassovsky et al. | 717/126 |
| 7,840,841 B2 | 11/2010 | Huang et al. | |
| 8,381,192 B1 | 2/2013 | Drewry et al. | |
| 8,527,239 B2 | 9/2013 | Sowerby et al. | |
| 8,615,739 B2 | 12/2013 | Nir et al. | |
| 2008/0306711 A1* | 12/2008 | Bansal | 702/182 |
| 2009/0199160 A1* | 8/2009 | Vaitheeswaran | G06F 11/3414 717/124 |
| 2012/0253745 A1 | 10/2012 | Dhanapal et al. | |
| 2013/0078983 A1 | 3/2013 | Doshi et al. | |
| 2013/0179858 A1 | 7/2013 | Mecke et al. | |
| 2014/0282434 A1* | 9/2014 | Eilam et al. | 717/131 |

OTHER PUBLICATIONS

Fernando et al., "Performance Testing Mobile Applications", provided by searcher Sun Smart IP Services on Jan. 3, 2014, <http://www.anztb.org/userfiles/files/PerfTestingMobAppl_10Apr13.pdf>.

(Continued)

*Primary Examiner* — Wei Zhen
*Assistant Examiner* — Andrew M Lyons
(74) *Attorney, Agent, or Firm* — Noah A. Sharkan (57) ABSTRACT

According to one embodiment of the present invention, a method for analyzing test results is provided. The method for analyzing test results may include a computer, determining a first snapshot from a first set of snapshots, wherein the first snapshot is associated with a first set of data. The method may further include the computer determining a second snapshot from a second set of snapshots, wherein the second snapshot is substantially similar to the first snapshot, and wherein the second snapshot is associated with a second set of data. The method may further include the computer associating the first set of data and the second set of data with a third snapshot, responsive to determining that the second snapshot is substantially similar to the first snapshot, wherein the third snapshot is substantially similar to the first snapshot.

17 Claims, 3 Drawing Sheets (56) References Cited

OTHER PUBLICATIONS

Liang et al., "Contextual Fuzzing: Automated Mobile App Testing Under Dynamic Device and Environment Conditions", 2013, MSR-TR-2013-100, provided by searcher Sun Smart IP Services on Jan. 3, 2014, <http://research.microsoft.com/pubs/202242/confuzz_tr.pdf#page=1&zoom=190,0,796>.

Qian et al., "Profiling Resource Usage for Mobile Applications: A Cross-layer Approach", MobiSys'11, Jun. 28-Jul. 1, 2011, Bethesda, Maryland, USA, Copyright 2011 ACM 978-1-4503-0643-0/11/06.

* cited by examiner

MERGING AUTOMATED TESTING REPORTS

BACKGROUND OF THE INVENTION

The present invention relates generally to the field of automated testing of mobile software applications, and more particularly to analysis of reports generated by automated tests.

Automated testing of software applications is a common tool for verifying the functionality of new applications by simulating interactions with a user by executing one or more test steps and monitoring the result of each test step. Different forms of automated testing have different limitations and benefits depending on the goal(s) of the particular test. Two common forms of automated testing are performance testing, such as mobile resource usage monitoring and profiling testing or response time, in which a computer executes a series of test steps while recording information on one or more physical computing resources, and functional testing, in which a series of test steps are executed to determine whether the application under test responded to the test step in an appropriate manner.

In performance testing, a computer executes a series of test steps in an environment that simulates the type of device on which the application can be run. During the execution, an automated testing tool monitors various hardware components, such as CPU usage, battery metrics, RAM usage, virtual memory usage, network traffic, etc. During the execution of the performance test, the testing tool periodically takes snapshots in order to generate a visual record of what the application displays to a user at a given point in time. In a performance test, the testing tool also monitors events, such as when the application under test attempts to access a third-party service (e.g., a remote server, or a network), and records the timing of the event when the testing tool detects one.

In functional testing, software developers/testers supplement the code of the application under test with additional instructions, or instrumentation, to facilitate the functional test. The process of adding the additional code is known as "instrumenting" or "tainting" the application under test. The instrumentation consists of instructions to, for example, determine whether a particular test step passed (i.e., performed as expected), determine which particular method(s) were being executed in the test step, capture a snapshot of an application under test graphical user interface, and/or determine when particular events, such as accessing a remote server, take place.

SUMMARY

According to one embodiment of the present invention, a method for analyzing test results is provided. The method for analyzing test results may include a computer determining a first snapshot from a first set of snapshots, wherein the first snapshot is associated with a first set of data. The method may further include the computer determining a second snapshot from a second set of snapshots, wherein the second snapshot is substantially similar to the first snapshot, and wherein the second snapshot is associated with a second set of data. The method may further include the computer associating the first set of data and the second set of data with a third snapshot, responsive to determining that the second snapshot is substantially similar to the first snapshot, wherein the third snapshot is substantially similar to the first snapshot.

According to another embodiment, a computer program product for analyzing test results is provided. The computer program product may include one or more computer-readable storage media and program instructions stored on the one or more computer-readable storage media. The computer-readable storage media may have stored thereon program instructions to determine a first snapshot from a first set of snapshots, wherein the first snapshot is associated with a first set of data. The computer-readable storage media may also have stored thereon program instructions to determine a second snapshot from a second set of snapshots, wherein the second snapshot is substantially similar to the first snapshot, and wherein the second snapshot is associated with a second set of data. The computer-readable storage media may also have stored thereon program instructions to associate the first set of data and the second set of data with a third snapshot, responsive to determining that the second snapshot is substantially similar to the first snapshot, wherein the third snapshot is substantially similar to the first snapshot.

According to another embodiment, a computer system for analyzing test results is provided. The computer system may include one or more computer processors. The computer system may further include one or more computer-readable storage media and program instructions stored on the one or more computer-readable storage media. The computer-readable storage media may have stored thereon program instructions to determine a first snapshot from a first set of snapshots, wherein the first snapshot is associated with a first set of data. The computer-readable storage media may also have stored thereon program instructions to determine a second snapshot from a second set of snapshots, wherein the second snapshot is substantially similar to the first snapshot, and wherein the second snapshot is associated with a second set of data. The computer-readable storage media may also have stored thereon program instructions to associate the first set of data and the second set of data with a third snapshot, responsive to determining that the second snapshot is substantially similar to the first snapshot, wherein the third snapshot is substantially similar to the first snapshot.

DETAILED DESCRIPTION

Different methods of automated testing provide insight into different aspects of the application under test and can aid software developers in identifying and solving developmental errors in the application under test. However, traditional methods of automated testing also include limits in applicability. For example, performance testing provides a clear picture of how a particular system or device will react to the execution of an automated test. Performance testing enables software developers to identify resource bottlenecks (e.g., excessive processor usage) which can affect the application's performance. However, performance testing has limitations, in that it is most useful when run on un-instrumented application code. Instrumentation (i.e., additional code built into the application under test for automated testing purposes that performs actions outside of the base application under test code) creates additional overhead when executed by a testing tool. The additional overhead results in skewed data with respect to resource usage data collected by the performance test. Additionally, because there is no instrumentation, performance testing requires that snapshots of the application be captured at regular time intervals, which may or may not correspond to a change in the application itself. Similarly, functional testing has benefits and limitations.

Functional testing, which can be conducted on instrumented application code, collects crucial software development information, such as which programming language methods are being executed at a particular step and whether a particular test step passed or failed the test. However, the instrumentation slows down the execution of the application under test and, therefore, does not provide the real time data that performance testing provides. Because of the effect of instrumentation on the execution of the application, bottlenecks are difficult to identify using instrumented versions of the application under test. Embodiments of the present invention provide a way to assimilate the results of both types of testing in a manner that provides the benefits of each in a single output report while minimizing the drawbacks of each method.

Figure 1:
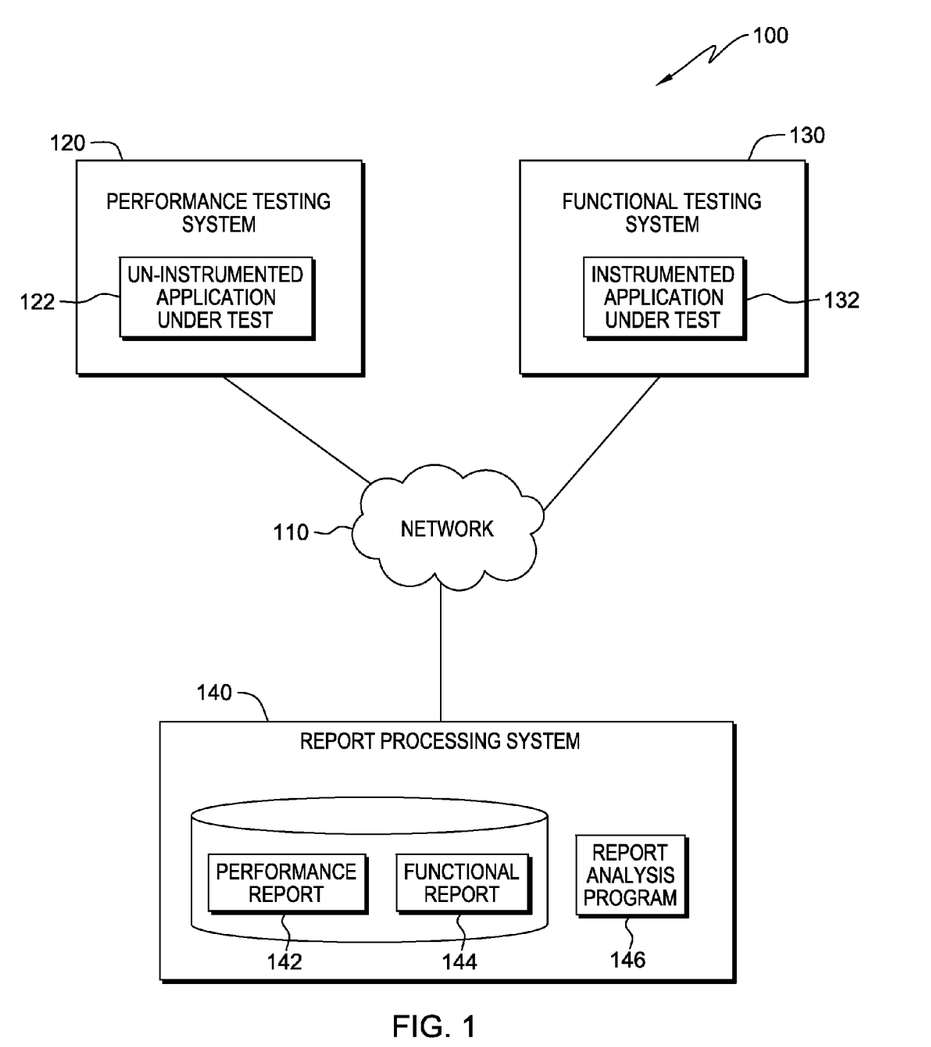
FIG. 1 is a functional block diagram illustrating an automated testing environment, in accordance with an embodiment of the present invention.

The present invention will now be described in detail with reference to the Figures. FIG. 1 is a functional block diagram illustrating an automated testing environment ("environment"), generally designated 100, in accordance with one embodiment of the present invention.

Environment 100 includes performance testing system 120, functional testing system 130, and report processing system 140, all interconnected over network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communications between performance testing system 120, functional testing system 130, and report processing system 140.

In various embodiments, performance testing system 120, functional testing system 130, and report processing system 140 can each be a server, a laptop computer, a tablet computer, a notebook computer, a personal computer (PC), a desktop computer, a personal digital assistant (PDA), or a smart phone, respectively. In an embodiment, report processing system 140 can be any programmable electronic device with access to performance report 142, functional report 144, and report analysis program 146 and capable of executing report analysis program 146. In another embodiment, report processing system 140 represents a computing system utilizing clustered computers and components to act as a single pool of seamless resources. Report processing system 140 may include internal and external hardware components, as depicted and described in further detail with respect to FIG. 3.

Performance testing system 120 includes un-instrumented application under test 122. Un-instrumented application under test 122 is a copy of an application under test that includes application code for the application as it will be executed by a computing device. No additional code (i.e., instrumentation) is included in un-instrumented application under test 122. In an example embodiment, un-instrumented application under test 122 is a mobile application designed for execution on a mobile device, such as a smart phone or a tablet computer. In other embodiments, un-instrumented application under test 122 can be any other type of software application. In various embodiments, performance testing system 120 simulates the device on which un-instrumented application under test 122 is designed to execute and collects resource utilization data in order to generate a performance report, such as performance report 142.

Functional testing system 130 includes instrumented application under test 132. Instrumented application under test 132 is a copy of an application under test that includes supplemental application code (instrumentation) that, when executed by functional testing system 130, collects data on the application under test. In general, instrumented application under test 132 is an instrumented version of the same mobile software application as un-instrumented application under test 122. Examples of the data that can be collected using instrumentation include whether a particular test step passed or failed, which method(s) are being executed at a given test step, recording when the application under test accesses certain third-party resources (e.g., a network or remote server), and capturing a snapshot of a graphical user interface for each test step executed. In an example embodiment, un-instrumented application under test is a mobile application designed for execution on a mobile computing device, such as a smart phone or a tablet computer. In other embodiments, instrumented application under test 132 can be any other type of software application. In various embodiments, functional testing system 130 simulates the device on which instrumented application under test 132 is designed to execute and collects functional data which can be presented in a functional report, such as functional report 144. In one embodiment, instrumented application under test 132 is an instrumented version of un-instrumented application under test 122.

Report processing system 140 includes performance report 142, functional report 144, and report analysis program 146. In an example embodiment, performance report 142 and functional report 144 are received from performance testing system 120 and functional testing system 130, respectively, via network 110, and stored locally in a storage device. Performance report 142 is a collection of data that is generated in response to performance testing system 120 executing un-instrumented application under test 122. Performance report 142 includes, for example, a set of data detailing resource usage by un-instrumented application under test 122 during execution. In various embodiments, resources monitored (i.e., specific data points) can include CPU usage, RAM usage, input traffic, output traffic, battery life, etc. Performance report 142 also includes one or more snapshots of the graphical user interface of un-instrumented application under test 122. The one or more snapshots can be captured by performance testing system 120 at regular time intervals (e.g., once per second).

Performance report 142 also includes information, including a time stamp, detailing events (i.e. data points in the set of data that performance report 142 includes) in which un-instrumented application under test 122 communicates with common services. Events include such activities as accessing a network, Bluetooth® (Bluetooth is a registered trademark of Bluetooth SIG, Inc.) connections, remote servers, etc. In an example embodiment, performance report 142 includes time information regarding both when the communication started and when the communication ended. In various embodiments, the data included in performance report 142 can be presented as one or more two-dimensional plots in which one axis represents time and the other axis represents the resource being monitored. The periodic snapshots and event information can be displayed on a plot where one axis corresponds to time, and the location of a snapshot or event on the plot corresponds to the time at which the snapshot was recorded or the event occurred.

Functional report 144 is a collection of data that is generated when functional testing system 130 executes instrumented application under test 132. Functional report 144 includes, for example, a set of data detailing snapshots corresponding to test steps executed by functional testing system 130, events in which instrumented application under test 132 communicates with common services, whether each test step succeeded (i.e., the results of the test matched expected results), and one or more methods executed by functional testing system 130. In various embodiments, the data included in functional report 144 can be displayed in a one-dimensional graph where the one dimension represents a time-line and the events and snapshots can be displayed along the time-line at the appropriate locations.

Report analysis program 146 is a software application with functionality to access the data stored in performance report 142 and functional report 144 in order to generate a single, correlated report which accurately maps information from one report to the other in order to generate a complete picture of both the resource performance of an application under test and the functional aspects of the application under test. In one embodiment, report analysis program 146 merges performance report 142 and functional report 144 in order to generate a third, correlated report. In another embodiment, report analysis program 146 merges the data from performance report 142 into functional report 144 (and/or vice versa).

Figure 2:
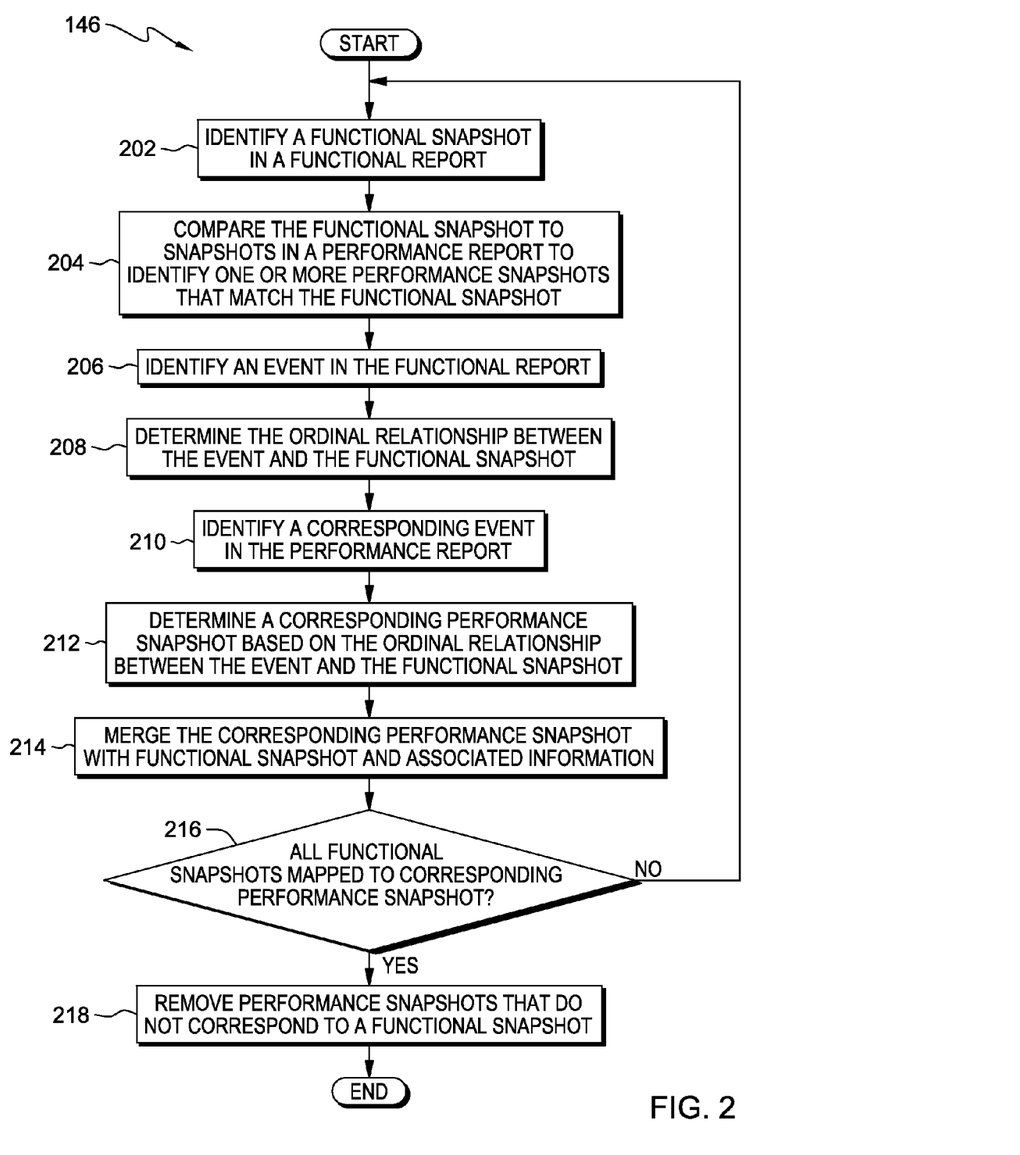
FIG. 2 is a flowchart depicting operational steps of a report analysis program, within the environment of FIG. 1, in accordance with an embodiment of the present invention.

FIG. 2 is a flowchart depicting operational steps of report analysis program 146, within the environment of FIG. 1, in accordance with an exemplary embodiment of the present invention. To begin with, performance testing system 120 executes a series of test steps on un-instrumented application under test 122, and functional testing system 130 executes a substantially similar series of test steps on instrumented application under test 132. Performance testing system 120 generates performance report 142 based on the series of test steps it executes on un-instrumented application under test 122. Performance testing system 120 transmits performance report 142 to report processing system 140 via network 110. Functional testing system 130 generates functional report 144 based on the series of test steps it executes on instrumented application under test 132. Functional testing system 130 transmits functional report 144 to report processing system 140 via network 110. Performance report 142 and functional report 144 each include one or more snapshots and the data detailing particular events that occurred in the performance test and functional test, respectively (e.g., network communications, remote server access, etc.).

Report analysis program 146 identifies a functional snapshot in functional report 144 (step 202). In the exemplary embodiment, functional report 144 includes at least one snapshot of the application under test graphical user interface for each test step that functional testing system 130 executed on instrumented application under test 132. The snapshots capture the visual response of instrumented application under test 132 to the test step performed thereon. In one embodiment, the identified functional snapshot is the first snapshot that was captured during functional testing, as determined by a time stamp associated with the snapshot through the instrumentation of instrumented application under test 132.

Report analysis program 146 compares the functional snapshot to one or more snapshots in performance report 142 to identify one or more performance snapshots that match the functional snapshot (step 204). In the exemplary embodiment, performance report 142 may contain more snapshots than functional report 144 because functional report 144 includes one snapshot for each test step performed (as a result of instrumentation), while performance testing system 120 captures snapshots at regular intervals. Therefore, if a single test step takes longer than the regular intervals at which performance testing system 120 captures snapshots, then multiple performance snapshots are captured for the test step. Report analysis program 146 compares the functional snapshot with the one or more performance snapshots using a duplicate photo detector. Duplicate photo detectors are common in the art, and many are available as commercial products or software downloads. Photo duplicate detectors analyze two images to determine if the images are the same or similar relative to a pre-determined threshold. One method of comparing images is by identifying the locations of edges in each image under comparison by x-y coordinates and comparing the x-y coordinates for each image to determine if they match. Additionally, many photo duplicate detectors compare pixels between the two images to determine if the pixels have the same or similar values and, if so, then the images are determined to be a match. The result of step 204 is a functional snapshot and one or more performance snapshots that are determined to match.

Report analysis program 146 identifies an event in functional report 144 (step 206). In the exemplary embodiment, functional report 144 includes data detailing one or more events in which instrumented application under test 132 communicated with certain resources, devices, or services. The services can be, for example, third party services, such as accessing a remote server, establishing a Bluetooth® connection, accessing a network, accessing an SD card, etc. In general, an event can be access to any type of resource which instrumented application under test 132 accessed during the execution of the test steps that resulted in recording the name of the service being accessed and the time at which the service was accessed.

Report analysis program 146 determines the ordinal relationship between the event and the functional snapshot (step 208). In the exemplary embodiment, report analysis program 146 compares the time stamp of the event with the time stamp of the snapshot in order to determine which happened first.

Report analysis program 146 identifies a corresponding event in performance report 142 (step 210). In the exemplary embodiment, performance testing system 120 records information detailing one or more events in which un-instrumented application under test 122 communicated with certain devices or services. In the exemplary embodiment, report analysis program 146 uses the data detailing an event in functional report 144, such as the name of the service that was accessed or the ordinal relationship between the event and the functional snapshot, to determine an event in performance report 144 that has similar attributes (i.e., a corresponding event having the same name or similar identifying information).

For example, if report analysis program 146 determines that instrumented application under test 132 accessed a Bluetooth® network at time "T1," then report analysis program 146 searches performance report 142 to identify a time when un-instrumented application under test 122 accessed the same Bluetooth® network at time "T2." Although the times do not correspond, the events should occur in a consistent order because performance testing system 120 and functional testing system 130 perform substantially similar test steps (i.e., both testing systems execute test steps which perform actions that are the same, for purposes of embodiments of the present invention), and, therefore, the order in which events occur remains consistent between performance report 142 and functional report 144 (i.e., corresponding events occur in the same order in both reports). Based on the information recorded during performance and functional testing, such as the name of the service accessed and the order in which the services are accessed, report analysis program 146 can determine an event in performance report 142 that corresponds to a specific event in functional report 144.

Report analysis program 146 determines a corresponding performance snapshot in performance report 142 based on the ordinal relationship between the event in the functional report and the functional snapshot (step 212). In the exemplary embodiment, a plurality of performance snapshots can match the functional snapshot. In order to determine which performance snapshot most closely corresponds to the functional snapshot, report analysis program 146 determines the ordinal relationship between the event in functional report 144 and the functional snapshot (i.e., which happened first). Report analysis program 146 then locates a performance snapshot that bears the same ordinal relationship to the corresponding event in performance report 142. For example, if report analysis program 146 determines that instrumented application under test 132 accessed a Bluetooth® network right before a specific functional snapshot was captured, then report analysis program 146 searches performance report 142 to identify a performance snapshot that matches the specific functional snapshot and that was captured right after un-instrumented application under test 122 accessed the Bluetooth® network in the corresponding event.

Report analysis program 146 merges the corresponding performance snapshot and its associated information with the functional snapshot and its associated information (step 214). In the exemplary embodiment, report analysis program 146 replaces the performance snapshot with the functional snapshot. In an alternative embodiment, report analysis program 146 replaces the functional snapshot with the performance snapshot. In another embodiment, report analysis program 146 combines the information associated with the performance snapshot (i.e., the resource usage data for various resources at the time the snapshot was captured) with the information associated with the functional snapshot (i.e., whether the test step succeeded or failed, which methods were executed in the test step, etc.) to form a single report containing both sets of information.

Report analysis program 146 determines whether all functional snapshots are mapped to a corresponding performance snapshot (decision block 216). In the exemplary embodiment, report analysis program 146 maintains a record of how many functional snapshots are contained in functional report 144. Report analysis program 146 then counts each time a functional snapshot is mapped to a corresponding performance snapshot. After each mapping, report analysis program 146 compares the number of functional snapshots that have been mapped to performance snapshots with the total number of functional snapshots in functional report 144. If report analysis program 146 determines that all functional snapshots have not been mapped to corresponding performance snapshots (decision block 216, NO branch), then report analysis program 146 identifies a functional snapshot in the functional report that has not already been mapped to a corresponding performance snapshot (step 202).

If report analysis program 146 determines that all functional snapshots in functional report 144 have been mapped to corresponding performance snapshots (decision block 216, YES branch), then report analysis program 146 removes the performance snapshots from performance report 142 that do not correspond to a functional snapshot (step 218). In the exemplary embodiment, one or more performance snapshots can correspond to a single test step and, therefore, match a functional snapshot. However, step 212 results in each functional snapshot corresponding to a single performance snapshot. As a result, one or more performance snapshots can remain in performance report 142 to which a functional snapshot does not correspond after the information from functional report 144 and performance report 142 are combined. Report analysis program 146 removes the unmapped performance snapshots to generate a single report which consists of data points that include both functional testing information and performance testing information. The resulting report can be used to identify specific test steps (and the methods executed during the test steps) that correspond to resource usage that is above a desired amount and that software developers may wish to change in the application under test. In the embodiment of the present invention, this results in the creation of a new, correlated report, rather than modifying an existing report, and only the functional snapshots, the corresponding performance snapshots, or a combination thereof, are added to the correlated report, along with the associated performance data and associated functional data.

Figure 3:
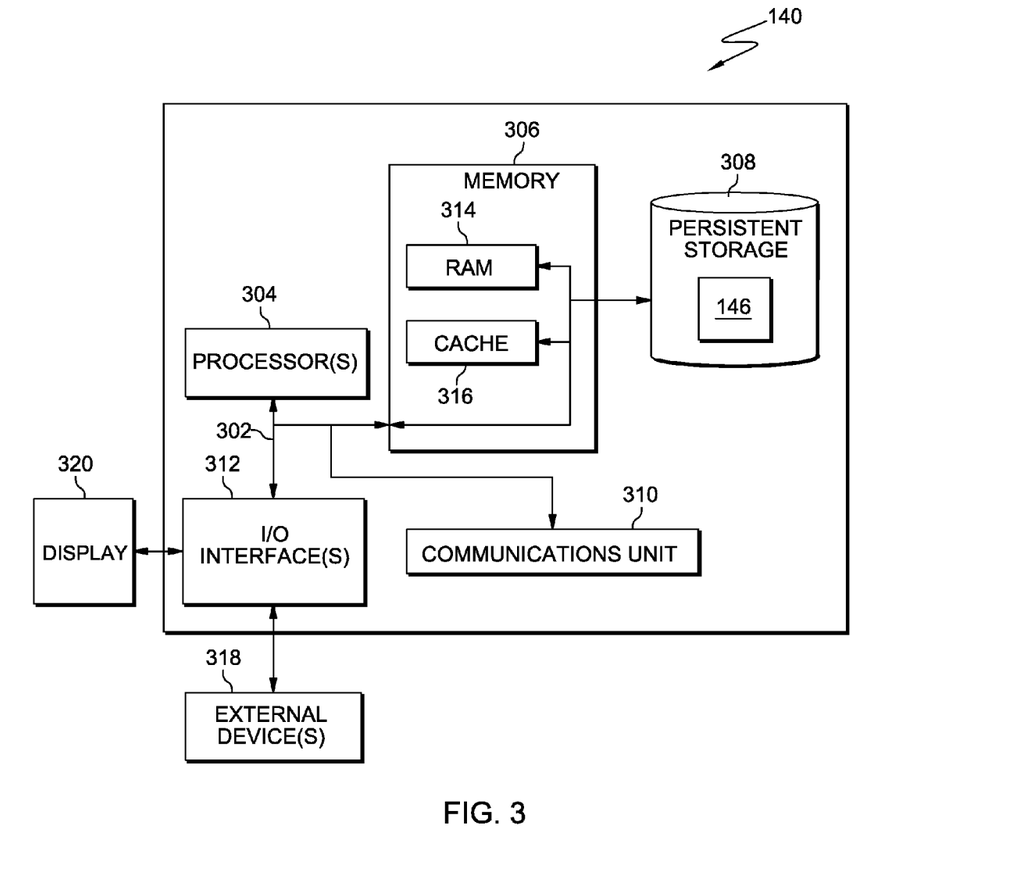
FIG. 3 depicts a block diagram of components of the report processing system in the automated testing environment of FIG. 1, in accordance with an embodiment of the present invention.

FIG. 3 depicts a block diagram of components of report processing system 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Report processing system 140 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Performance report 142, functional report 144, and report analysis program 146 are stored in persistent storage 308 for access and/or execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including performance testing system 120 and functional testing system 130. In these examples, communications unit 310 includes one or more network interface cards. Communications unit 310 may provide communications through the use of either or both physical and wireless communications links. Performance report 142, functional report 144, and/or report analysis program 146 may be downloaded to persistent storage 308 through communications unit 310.

I/O interface(s) 312 allows for input and output of data with other devices that may be connected to report processing system 140. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., performance report 142, functional report 144, and report analysis program 146, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for analyzing test results for an application, the method comprising:
   determining, by one or more computer processors, a first snapshot from a first set of snapshots in a functional testing report for an instrumented version of the application, wherein the first snapshot is associated with a first set of data, and wherein the first set of data is functional testing data;
   comparing, by one or more computer processors, the first snapshot to a second set of snapshots in a performance testing report for an un-instrumented version of the application, to determine a second snapshot in the second set of snapshots that is substantially similar to the first snapshot, wherein the second snapshot is associated with a second set of data, wherein the second set of data is resource performance data, and wherein the first snapshot is compared to the second set of snapshots using a duplicate photo detector; and
   responsive to determining that the second snapshot is substantially similar to the first snapshot, associating, by one or more computer processors, the first set of data and the second set of data with a third snapshot, wherein the third snapshot is substantially similar to the first snapshot.

2. The method of claim 1, wherein the third snapshot is the first snapshot.

3. The method of claim 1, wherein determining the second snapshot comprises:

determining, by one or more computer processors, that a first data point in the first set of data corresponds to a first event;
   determining, by one or more computer processors, an ordinal relationship between the first event and the first snapshot;
   determining, by one or more computer processors, a second data point in the second set of data, wherein the second data point corresponds to a second event, and the second event corresponds to the first event; and
   determining, by one or more computer processors, the second snapshot, based, at least in part, on the second data point and the ordinal relationship between the first event and the first snapshot.

4. The method of claim 3, wherein the first event and the second event correspond to an application under test accessing a network.

5. The method of claim 1, further comprising:
   identifying, by one or more computer processors, one or more performance bottlenecks based, at least in part, on the third snapshot and the first set of data.

6. A computer program product for analyzing test results for an application, the computer program product comprising:
   one or more computer-readable storage media and program instructions stored on the one or more computer-readable storage media, the program instructions comprising:
      program instructions to determine a first snapshot from a first set of snapshots in a functional testing report for an instrumented version of the application, wherein the first snapshot is associated with a first set of data, and wherein the first set of data is functional testing data;
      program instructions to compare the first snapshot to a second set of snapshots in a performance testing report for an un-instrumented version of the application, to determine a second snapshot in the second set of snapshots that is substantially similar to the first snapshot, wherein the second snapshot is associated with a second set of data, wherein the second set of data is resource performance testing data, and wherein the first snapshot is compared to the second set of snapshots using a duplicate photo detector; and
      program instructions to associate the first set of data and the second set of data with a third snapshot, responsive to determining that the second snapshot is substantially similar to the first snapshot, wherein the third snapshot is substantially similar to the first snapshot.

7. The computer program product of claim 6, wherein the third snapshot is the first snapshot.

8. The computer program product of claim 6, wherein the program instructions to determining the second snapshot comprise:
   program instructions to determine that a first data point in the first set of data corresponds to a first event;
   program instructions to determine an ordinal relationship between the first event and the first snapshot;
   program instructions to determine a second data point in the second set of data, wherein the second data point corresponds to a second event, and wherein the second event corresponds to the first event; and
   program instructions to determine the second snapshot, based, at least in part, on the second data point and the ordinal relationship between the first event and the first snapshot.

9. The computer program product of claim 8, wherein the first event and the second event correspond to an application under test accessing a network.

10. The computer program product of claim 6, further comprising:
program instructions to identify one or more performance bottlenecks based, at least in part, on the third snapshot and the first set of data.

11. A computer system for analyzing test results for an application, the computer system comprising:
one or more computer processors;
one or more computer-readable storage media;
program instructions stored on the computer-readable storage media for execution by at least one of the one or more processors, the program instructions comprising:
program instructions to determine a first snapshot from a first set of snapshots in a functional testing report for an instrumented version of the application, wherein the first snapshot is associated with a first set of data, wherein the first set of data is functional testing data, and wherein the first snapshot is compared to the second set of snapshots using a duplicate photo detector;
program instructions to compare the first snapshot to a second set of snapshots in a performance testing report for an un-instrumented version of the application, to determine a second snapshot in the second set of snapshots that is substantially similar to the first snapshot, wherein the second snapshot is associated with a second set of data, and wherein the second set of data is resource performance testing data; and
program instructions to associate the first set of data and the second set of data with a third snapshot, responsive to determining that the second snapshot is substantially similar to the first snapshot, wherein the third snapshot is substantially similar to the first snapshot.

12. The computer system of claim 11, wherein the third snapshot is the first snapshot.

13. The computer system of claim 11, wherein the program instructions to determining the second snapshot comprise:
program instructions to determine that a first data point in the first set of data corresponds to a first event;
program instructions to determine an ordinal relationship between the first event and the first snapshot;
program instructions to determine a second data point in the second set of data, wherein the second data point corresponds to a second event, and wherein the second event corresponds to the first event; and
program instructions to determine the second snapshot, based, at least in part, on the second data point and the ordinal relationship between the first event and the first snapshot.

14. The computer system of claim 13, wherein the first event and the second event correspond to an application under test accessing a network.

15. The method of claim 1, further comprising:
generating, by one or more computer processors, a results report comprising a plurality of snapshots from the functional testing report mapped to a plurality of snapshots from the performance testing report, wherein each snapshot of the results report is mapped to another snapshot of the results report that has a same ordinal relationship to an event that occurred during both functional testing of the instrumented version of the application and performance testing of the un-instrumented version of the application.

16. The computer program product of claim 6, further comprising:
program instructions to generate a results report comprising a plurality of snapshots from the functional testing report mapped to a plurality of snapshots from the performance testing report, wherein each snapshot of the results report is mapped to another snapshot of the results report that has a same ordinal relationship to an event that occurred during both functional testing of the instrumented version of the application and performance testing of the un-instrumented version of the application.

17. The computer system of claim 11, further comprising:
program instructions to generate a results report comprising a plurality of snapshots from the functional testing report mapped to a plurality of snapshots from the performance testing report, wherein each snapshot of the results report is mapped to another snapshot of the results report that has a same ordinal relationship to an event that occurred during both functional testing of the instrumented version of the application and performance testing of the un-instrumented version of the application.

* * * * *